United States Patent
McGranahan et al.

(10) Patent No.: US 11,494,531 B2
(45) Date of Patent: Nov. 8, 2022

(54) SYSTEMS AND METHODS FOR EQUIPMENT PERFORMANCE MODELING

(71) Applicant: SIGSENSE TECHNOLOGIES, INC., San Francisco, CA (US)

(72) Inventors: Nicholas J. McGranahan, San Francisco, CA (US); Matthew T. Burtch, San Francisco, CA (US); John Vinyard, San Francisco, CA (US)

(73) Assignee: SIGSENSE TECHNOLOGIES, INC., Oakland, CA (US)

( * ) Notice: Subject to any disclaimer, the term of this patent is extended or adjusted under 35 U.S.C. 154(b) by 939 days.

(21) Appl. No.: 16/190,692

(22) Filed: Nov. 14, 2018

(65) Prior Publication Data

US 2019/0163848 A1 May 30, 2019

Related U.S. Application Data

(63) Continuation of application No. PCT/US2017/033417, filed on May 18, 2017.

(60) Provisional application No. 62/337,951, filed on May 18, 2016.

(51) Int. Cl.
| | |
|---|---|
| *G06F 17/10* | (2006.01) |
| *G06F 30/20* | (2020.01) |
| *G06F 11/34* | (2006.01) |
| *G05B 23/02* | (2006.01) |
| *G06N 20/00* | (2019.01) |
| *G06F 111/10* | (2020.01) |
| *G01R 19/00* | (2006.01) |

(52) U.S. Cl.
CPC ......... *G06F 30/20* (2020.01); *G05B 23/0254* (2013.01); *G06F 11/3447* (2013.01); *G06N 20/00* (2019.01); *G01R 19/00* (2013.01); *G05B 2219/2619* (2013.01); *G06F 2111/10* (2020.01)

(58) Field of Classification Search
CPC .......................... G06F 17/5018; G06F 17/5036
USPC .......................................................... 703/2
See application file for complete search history.

(56) References Cited

U.S. PATENT DOCUMENTS

| | | | |
|---|---|---|---|
| 2004/0243636 A1 | 12/2004 | Hasiewicz et al. | |
| 2007/0005311 A1* | 1/2007 | Wegerich | G05B 17/02 703/2 |
| 2009/0105998 A1* | 4/2009 | Radibratovic | G06F 30/20 703/2 |
| 2010/0169030 A1 | 7/2010 | Parlos | |

OTHER PUBLICATIONS

WO, PCT/US2017/033417, ISR and Written Opinion, dated Aug. 31, 2017.

* cited by examiner

*Primary Examiner* — Andy Ho
(74) *Attorney, Agent, or Firm* — Edell, Shapiro & Finnan, LLC

(57) ABSTRACT

An equipment performance modeling platform is disclosed. In certain embodiments, an adaptive sensing coordinator acquires sensor measurements, configures and processes the sensor measurements for a specific statistical model, and sends the measurements to a server. A server performs data processing, provides storage (e.g., local or in a database), and provides an interface for data extraction. Statistical models are used to interpreting sensor values for a type of equipment, and a labeling mechanism labels performance occurrences.

24 Claims, 11 Drawing Sheets

FIG. 10

Labeling Mechanism for Additive Training Function

Selected Equipment: Refrigerator #2 ▽

Select Additive Models:

Type
- ☑ Refrigerator
- ☐ Washer
- ☑ Light

Previous Models
- ☑ Fridge #12425
- ☐ Fridge #12536
- ☑ Washer #2355

Subsystems
- ☑ Motor
- ☐ Compressor
- ☑ Pump

Env/Use
- ☑ Indoor Equip.
- ☐ Outdoor Equip.
- ☑ Day Use only

Start Training Function

1100

SYSTEMS AND METHODS FOR EQUIPMENT PERFORMANCE MODELING

CROSS-REFERENCE TO RELATED APPLICATIONS

The subject application is a continuation of PCT Patent Application No. PCT/US17/33417, filed May 18, 2017, which claims priority to U.S. Provisional Patent Application No. 62/337,951, filed on May 18, 2016, both of which are incorporated by reference herein in their entirety for all purposes.

FIELD

The present embodiments relate generally to sensor measurement, processing, analysis and interpretation. More particularly, the present embodiments are in the technical field of sensor measurement, analysis, and interpretation for the purpose of equipment diagnostics and monitoring. More particularly, the present embodiments are in the technical field of applying advanced statistical and self-adapting processes to received sensor data to provide specific equipment insights and diagnostics. The present disclosure provides analytic and operational tools for equipment manufacturers, field service organizations and asset owner-operators with regard to equipment operation.

BACKGROUND

Measurement and diagnosis tools are typically specific to the equipment under measure and diagnosis. Intelligence and processing techniques are typically specific to a measurement method where the measured traits are specific to the equipment under measure. Such specificity requires a lengthy and often expensive manual research and development cycle to adapt a sensing solution, or set of sensor measurements, to diagnose or recognize a particular fault or desired trait in a piece of equipment.

Innovative solutions to the above identified and other problems are desired and are included in embodiments of the present disclosure, many examples of which are described in detail herein.

SUMMARY

The present embodiments are directed to a platform to collect and catalog data, characterize, track and diagnose performance issues and maintenance conditions of multiple types of equipment using sensor measurements, a database, statistical modeling, and a labeling mechanism used to denote features of equipment operation that are significant. The platform integrates sensor coordinators, servers, statistical models and a labeling mechanism. The sensor coordinators configure and send sensor values to the server where statistical models are applied to the incoming data. The server incorporates a training function in which the labeling mechanism is used to build and improve the statistical models by tagging or labeling incoming and historical data.

The systems, methods, features and advantages of the disclosure will be or will become apparent to one with skill in the art upon examination of the following figures and detailed description. It is intended that all such additional methods, features and advantages be included within this description, be within the scope of the disclosure, and be protected by the accompanying claims. It is also intended that the disclosure is not limited to require the details of the example embodiments.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present disclosure.

FIG. 10 illustrates an exemplary mobile labeling mechanism including the additive training function for use with the present system, according to certain embodiments.

Figure 1A:
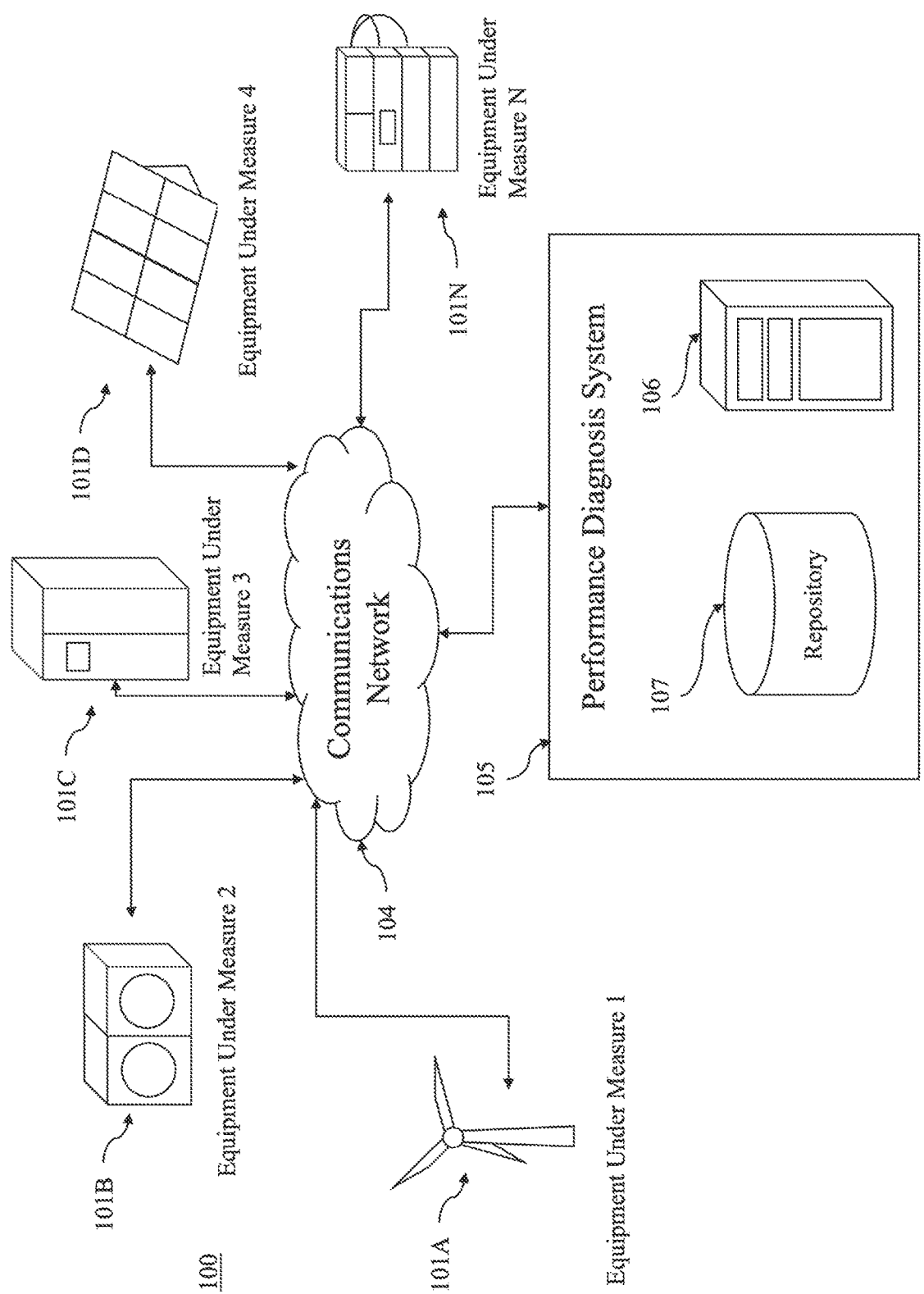
FIG. 1A illustrates an example computing system within which embodiments of the present disclosure may operate.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

The various embodiments provided herein are generally directed to a platform to collect and catalog data, characterize, track and diagnose performance issues and maintenance conditions of multiple types of equipment using sensor measurements, a database, statistical modeling, and human feedback used in determining significant features of the processes described herein.

FIG. 1A illustrates an example computing system within which embodiments of the present disclosure may operate. Measurement data from sensors contained within, on, or near equipment under measure 101A-101N may be transmitted to a performance diagnosis system 105 via a communications network 104. The performance diagnosis system 105 may comprise a server 106 in communication with at least one repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the performance diagnosis system 105.

The server 106 may be embodied as a computer or computers as known in the art. The server 106 may provide for receiving of electronic data from various sources, including but not necessarily limited to the equipment under measure 101A-101N. For example, the server 106 may be operable to receive communications in the form of sensor data provided by the equipment under measure 101A-101N or client devices in communication therewith. The server 106 may facilitate the diagnosis of equipment issues or failures.

The enterprise repository may be embodied as a data storage device such as a Network Attached Storage (NAS) device or devices, or as a separate database server or servers. The repository 107 includes information accessed and stored by the server 106 to facilitate the operations of the performance diagnosis system 105.

The equipment under measure 101A-101N may be any equipment, industrial or otherwise, that requires data collection for diagnostics as explained above. Electronic data received by the server 106 from the equipment under measure 101A-101N may be provided in various forms and via various methods. For example, the equipment under measure 101A-101N may include washers, dryers, refrigerators, other home or commercial appliances, solar panels, windmills, semiconductor or other manufacturing equipment, and the like.

Figure 1B:
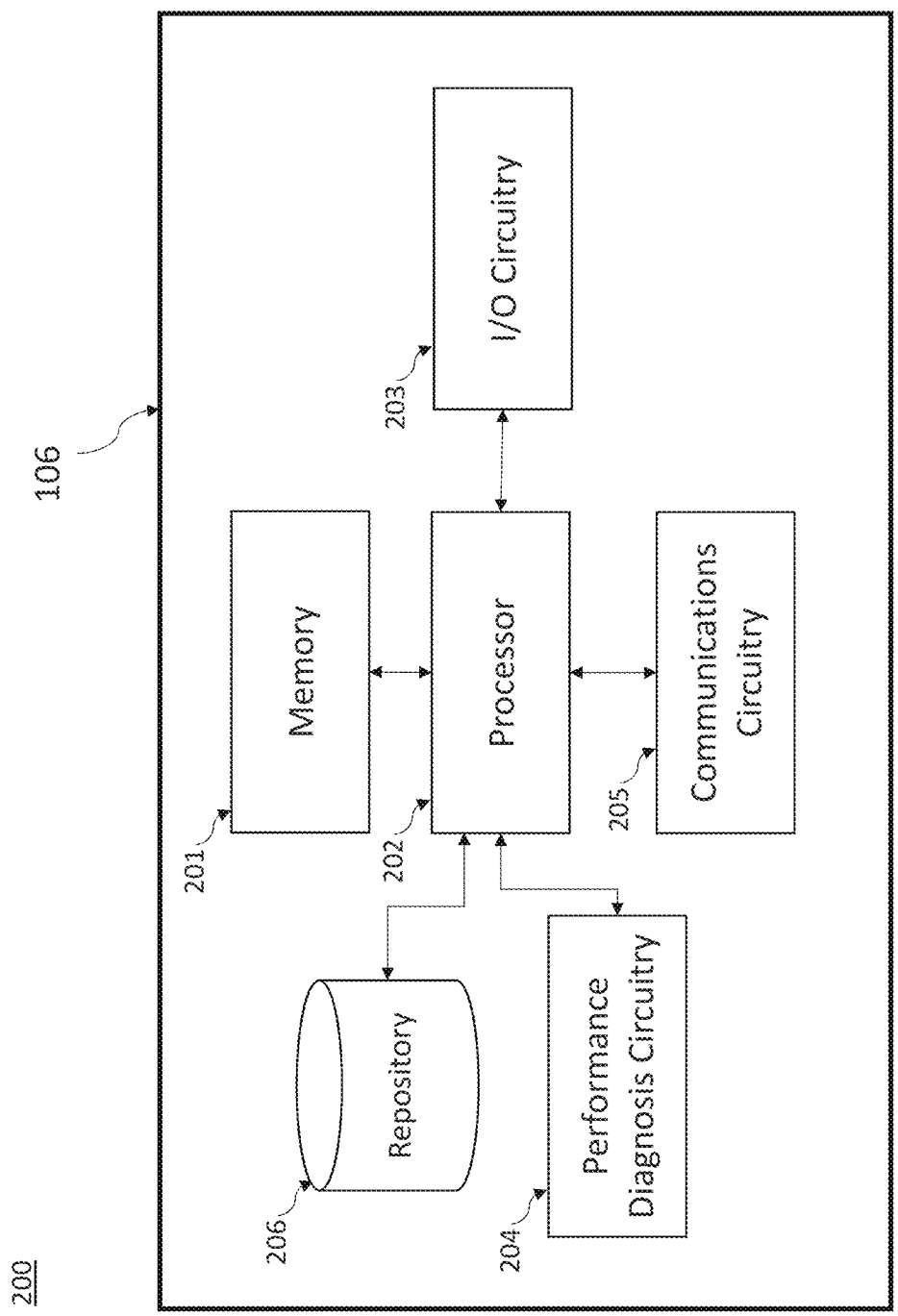
FIG. 1B illustrates an exemplary schematic diagram of a computing entity according to one embodiment of the present disclosure.

The server 106 may be embodied by one or more computing systems, such as apparatus 200 shown in FIG. 1B. The apparatus 200 may include a processor 202, a memory 201, input/output circuitry 203, communications circuitry 205, repository 206 and performance diagnosis circuitry 204. The apparatus 200 may be configured to execute the operations described above with respect to FIG. 1A and below with respect to FIGS. 2-10. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the processes and/or operations described herein when the instructions are executed.

In some embodiments, the apparatus 200 may include input/output circuitry 203 that may, in turn be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The performance diagnosis circuitry 204 includes hardware configured to support receipt and processing of performance data. The performance diagnosis circuitry 204 may utilize processing circuitry, such as the processor 202, to perform these actions. The performance diagnosis circuitry 204 may send and/or receive data from repository 206. It should also be appreciated that, in some embodiments, the performance diagnosis circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 2:
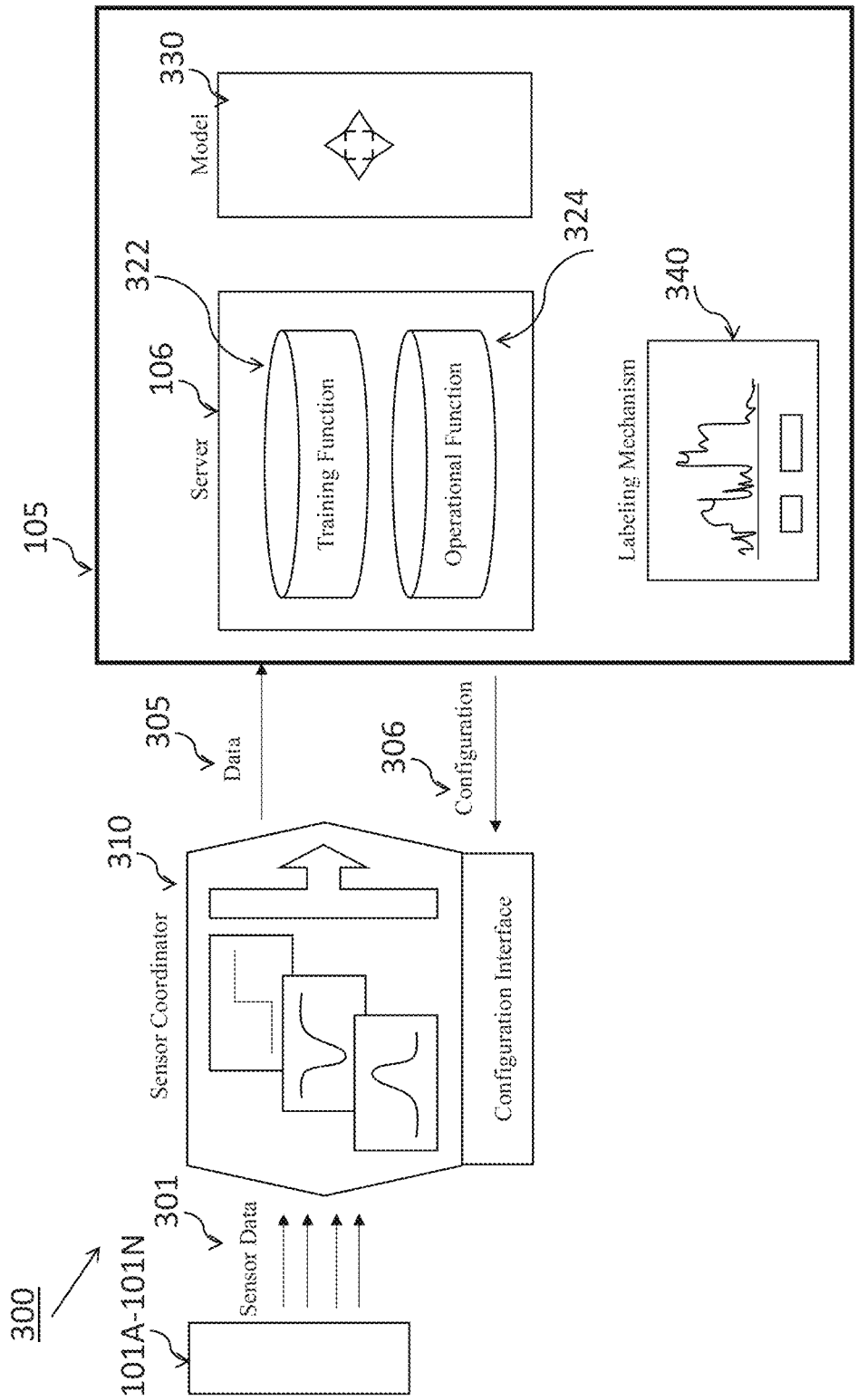
FIG. 2 illustrates an exemplary architecture for use with the present system, according to certain embodiments.

FIG. 2 illustrates an exemplary architecture 300 for use with the present system, according to certain embodiments. In certain embodiments, an adaptive sensing coordinator 310, installed at a side of equipment under measure 101A-101N, acquires sensor measurements from equipment under measure 101A-101N, configures and processes the sensor measurements for a specific statistical model, and sends the measurements to a server 106. Server 106 performs data processing, provides storage (e.g., local or in a database/repository 107), and provides an interface for data extraction. Statistical models 330 are used in interpreting sensor values for a specific type of equipment, and a labeling mechanism 340 is used for assigning an association, or label, between a real-world event and data related to a piece of equipment under monitoring.

As mentioned above, adaptive sensing coordinator (also referred to herein as "coordinator") 310 is installed at a site of equipment under monitor 101A-101N. The adaptive sensing coordinator 310 acquires sensor measurements or data 301, configures and processes the sensor measurements, and sends the processed measurements/data 305 to the server 106 of performance diagnosis system 105. The adaptive sensing coordinator 310 is configurable 306 by the server 106 to perform sensor processing for a specific statistical model of the statistical models 330. The adaptive sensing coordinator 310 is defined as a set of configurable processing steps and a communication channel to the server.

The processing steps in the coordinator are continuously updated as the needs of the statistical model change for a specific installation. This allows the data available to the statistical model to be flexible as needs change.

The adaptive sensing coordinator 310 incorporates any number of raw sensor types. The sensors are either embedded in the coordinator 310 or connected to the coordinator 310 via a wired or wireless network. In the preferred embodiment, the coordinator 310 records the following measurements: mains electricity peak and RMS voltage; mains electricity peak and RMS current; mains electricity active, reactive, and apparent power and energy; power quality measurements including peak voltages and currents; transient events including voltage and current surges, spikes, and EFT transients; electrical mains ground-to-neutral peak and RMS voltage; electrical mains voltage and current harmonics and line frequency; ambient temperature and humidity.

According to certain embodiments, the coordinator 310 incorporates additional sensing capabilities including vibration, acceleration, sound or air pressure, gas and chemical sensing, thermal and optical imaging.

According to certain embodiments, the coordinator 310 acts as a sensor hub by incorporating a local networking technology (Zigbee®, WIFI access point, BLE central, 802.15.4, 6-LoWPAN, Z-wave) to connect to and aggregate data 301 from nearby sensors.

In addition to raw sensor values, the coordinator 310 records any number of higher-order derivations based on raw sensor values. In the preferred embodiment, these mathematical calculations include, but are not limited to, the following: Fourier and wavelet transforms; any number of filter functions including low-pass, high-pass, and other bandform or noise-reduction filters; statistical indices including mean, maximum, minimum, and standard deviations; derivatives, integrations, sums, and basic arithmetic operations; indication of environment or equipment operational state or state-changes.

The coordinator 310 is dynamically configured 306 during field operation to perform different sensing functions and derivations. Configurations 306 include adjusting sample rate, adding or removing sensor measurements or higher-order derivations, triggering the collection of measurements or derivations based on other sensor values or derivations. This configuration is made to provide the necessary data for a given statistical model, and is also made based on available network bandwidth and other installation parameters.

According to certain embodiments, the configurable processing performed by the coordinator includes a neural network or some combination of internal layers of a neural network to transform raw data into higher-order representations. This neural network can be customized through the configuration interface for a type of equipment, specific unit, or specific application.

According to certain embodiments, the configurable processing performed by the coordinator includes the first few layers of a neural network with the final layers performed in the statistical model 330.

According to certain embodiments, a single coordinator 310 is installed for each piece of equipment under monitor (e.g., 101A-101N). In other embodiments, a single coordinator 310 is installed on multiple assets (i.e., multiple pieces of equipment under monitor). In the case of a single coordinator 310 installed on multiple assets, the collection of assets can be monitored as a group, and each individual asset can be monitored through disaggregation in the statistical model.

The adaptive sensing coordinator 310 communicates with the server 106 over a network via any available networking technology. In the preferred embodiment, the coordinator 310 communicates with the server 120 via Wi-Fi WLAN. In other embodiments, the coordinator 310 incorporates a cellular network connection for access to the server 106.

The adaptive sensing coordinator 310 is realized on various technology platforms. Because the coordinator 310 is defined as a set of configurable processing steps and a communication channel to the server 320, it is thus independent of the application platform. The sensing coordinator 310 may be embodied as a set of steps, a library, or SDK running on an embedded processor; a processing and communication module installed in a third party device; or an end-product installed in the field.

The server 106 collects and catalogs data 305 from the adaptive sensing coordinator 310 and other data sources. The server 106 uses this data along with statistical models 330 to characterize and track the operation, as well as diagnose performance issues and maintenance conditions of multiple types of equipment. The server 106 also incorporates a training function 122 in which the statistical models are built or improved upon.

According to certain embodiments, during a server operational function 324, data 305 is received by the server 106 and is stored by a database with a reference to the asset (i.e., piece of equipment under measure 101A-101N), asset type, measurement type(s), time of collection and any known information on the operation of the equipment at the given time. This allows the creation and generation of a database of collected sensor data 301 for the given coordinator 310. The database is used to establish a baseline of operation for the equipment over time, and is used as a comprehensive training set for statistical characterization. The database can span multiple individual instances of the equipment and allows a statistical model to apply to the entire deployed set of the equipment.

Data 305 for the server 106 and the statistical models 330 can be any combination of data. Sources include data from coordinators 310, communication modules, equipment under monitor, and integrations to other databases. Data classes include sensor data, weather data, user data, and equipment log files. Data formats include any combination of numbers, or unstructured text strings or documents describing the equipment under monitor.

According to certain embodiments, the server 106 notifies users or operators (of equipment under measure 101A-101N) of a detected anomaly or set of readings that do not match an existing operational state. The detection of an anomaly, the entering or exiting of a known state, or the application of a heuristic condition can all trigger the notifications automatically.

Configurable heuristics may be set to detect specific events of interest. There may be voltage or current specific limits which, when crossed, a user should be notified. These heuristics are tested, and action is taken as data is collected by the server. These heuristics can be turned on and off to supplement the training labels, or left on permanently to provide known states and specific error conditions.

Figure 3:
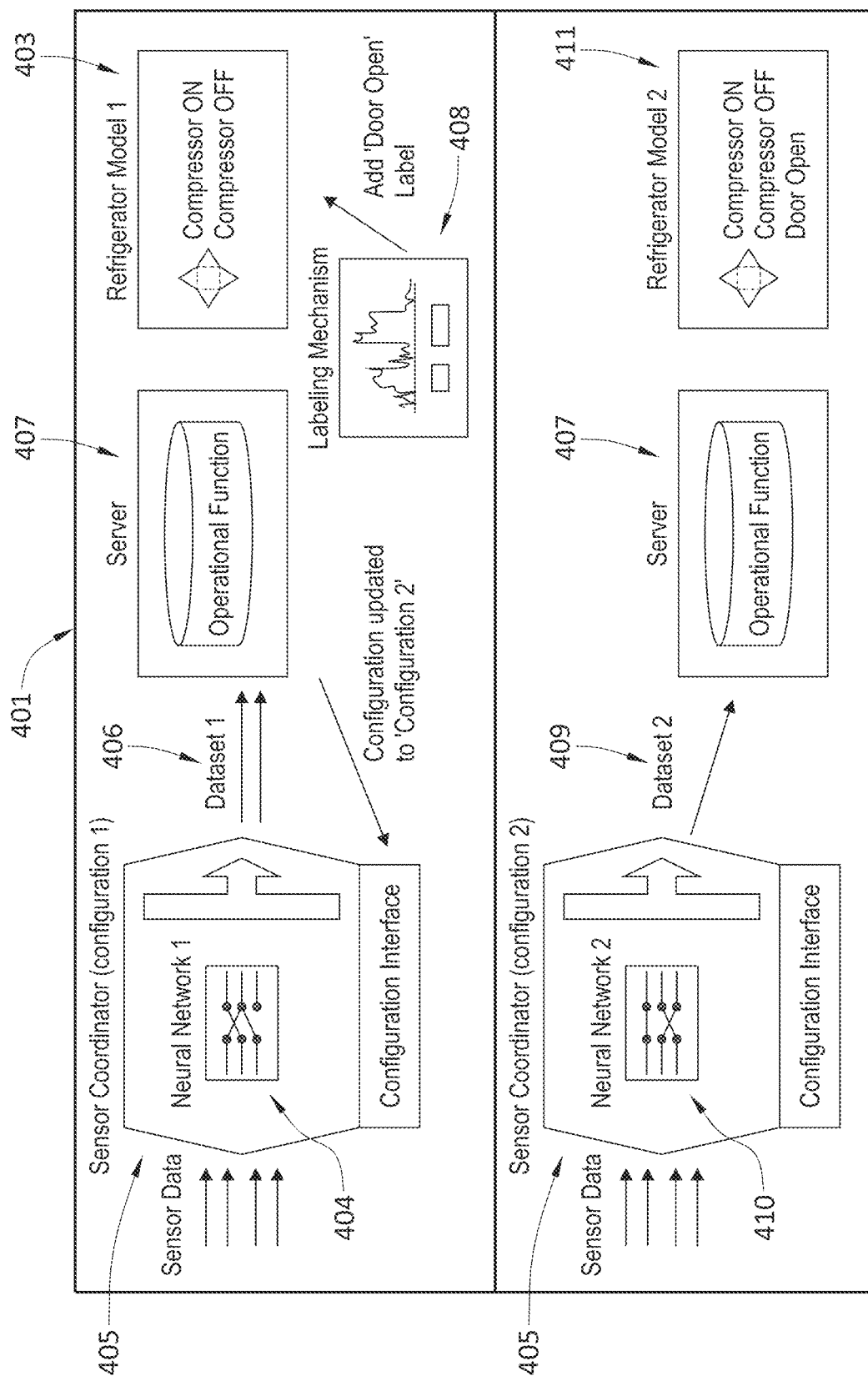
FIG. 3 illustrates an exemplary operational mode in which the adaptive sensing coordinator is reconfigured to match the new needs of an updated statistical model.

FIG. 3 illustrates an exemplary operational mode in which a sensor coordinator configuration 401 is updated 402 to match new needs of an updated statistical model, according to embodiments of the present disclosure. In this example, an initial statistical model 403 for a refrigerator is capable of detecting two states: Compressor ON, and Compressor OFF. With this configuration, the coordinator 405 has processing performing 'neural network 1' calculations 404, and the data sent to the server 407 is 'Dataset 1' 406. Through the training function, the user adds an additional label, 'Door Open' 408, and the model is trained. To update the operational model, the server 407 updates the coordinator 405 with the new configuration, 'neural network 2' 410, which includes a new dataset 'Dataset 2' 409, and the model is updated to 'Refrigerator Model 2' 411. In this way, the dataset is dynamically updated to match the changing needs of the statistical model. This process is repeated continually as more adjustments are made.

Figure 4:
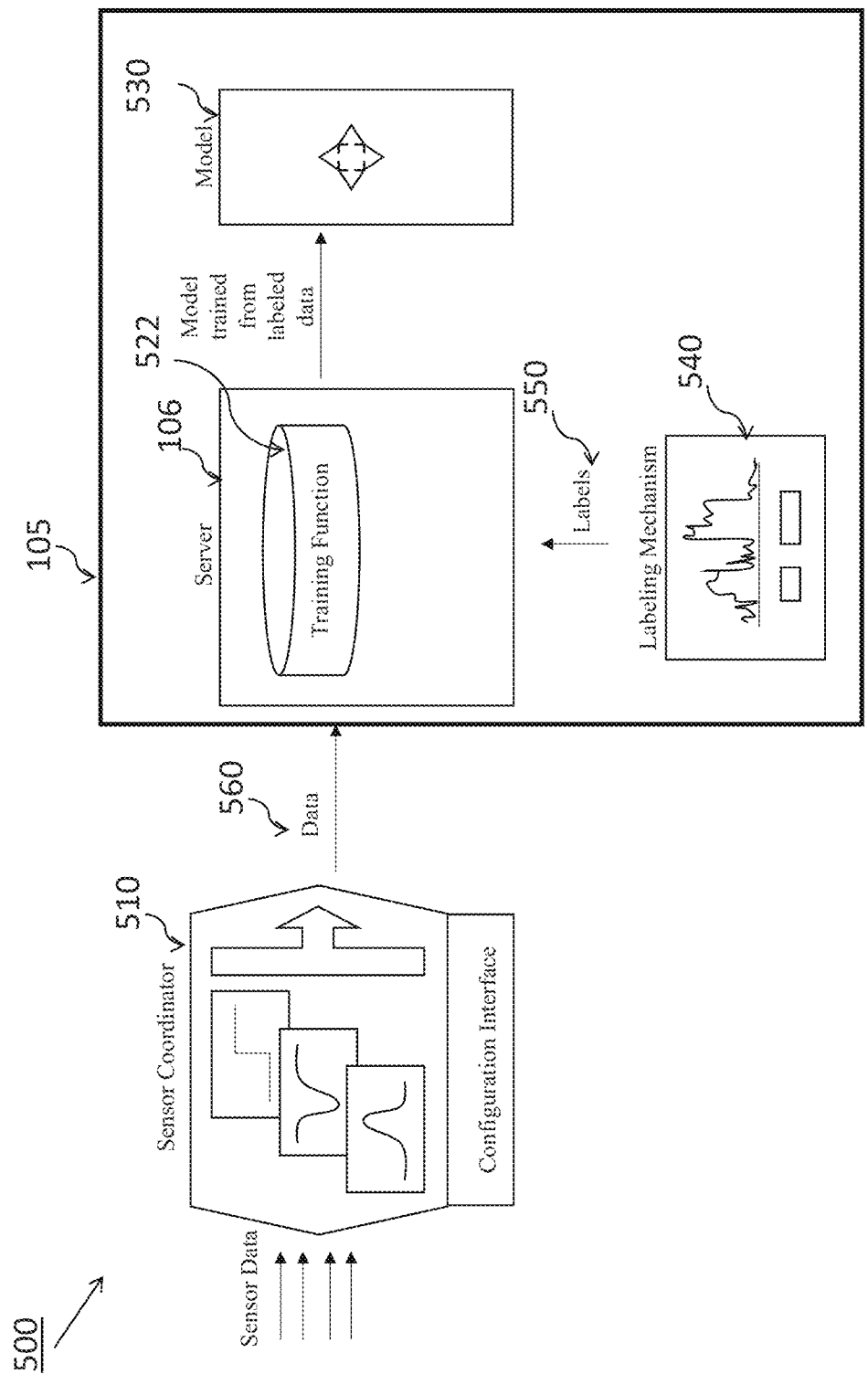
FIG. 4 illustrates an exemplary architecture including training function for use with the present system, according to certain embodiments.

FIG. 4 illustrates an exemplary architecture 500 including a training function 522 for use with the present system, according to certain embodiments. According to certain embodiments, the server 106 includes a training function 522 by which the equipment is characterized. The training function 522 uses statistical modeling techniques 530 to both characterize the processed sensor data input 560 and to generate a model of labels 550, allowing understanding of the system's operational usage and utilization. This training can operate either online (with the model 530 being updated based on new input data 560 as it comes into the system) or offline (with the model generated 530 at once using a batch of pre-collected data 560).

Figure 5:
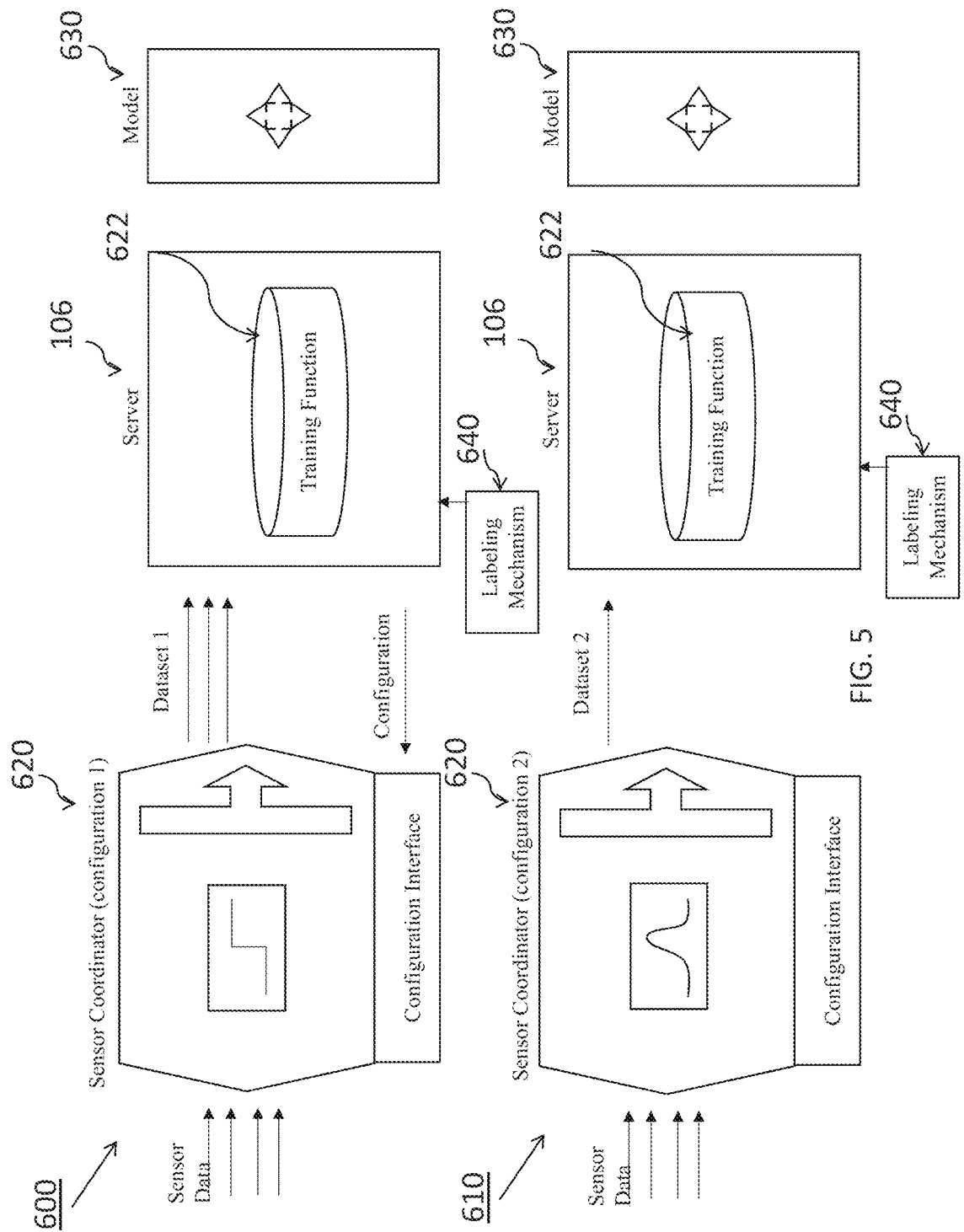
FIG. 5 illustrates exemplary architectures including operational function for use with the present system, according to certain embodiments.

FIG. 5 illustrates exemplary architectures 600 and 610 including operational function for use with the present system, according to certain embodiments. The server 106 can be run on premise, or on hosted machines, or distributed, mobile or PC-based platforms. A hosted web dashboard front-end, a mobile application or other integration can serve as an interface for presenting data to users. Statistical models 630 are created for a specific type of equipment (received and processed by sensor coordinator 620) and are used by the server 106 to interpret incoming and historical data for a specific piece of equipment (under measure, e.g., 101A-101N, not shown). The models 630 are created and improved using the server's 106 training function 622 and a labeling mechanism 640.

Statistical models 630 are created for a type of equipment, or manufacturer make and model, and are used on multiple individual pieces of equipment within that type. In this way, the statistical models 630 incorporate data from many deployed units of a given type.

Statistical models 630 can be related in hierarchical and sibling relationships to enable sharing of processes, training data, or other features.

Statistical models 630 include any number of heuristic processes describing equipment operation and utilization events or states. These heuristics can be selected and configured by users to tailor the statistical model to the user's understanding of normal and abnormal equipment operation and utilization.

According to certain embodiments, statistical models 630 include steps for comparing pieces of equipment that have a specific statistical model applied, and detecting operational anomalies.

Configuration settings within the statistical models 630 can provide for sensor coordinators 620 to allow coordinators assigned to a specific model to be configured to provide the necessary data and processing needed by the model.

According to certain embodiments, statistical models 630 include multiple 'unsupervised learning' methods including clustering, latent variable model learning, and the like in order to discover patterns in equipment operation.

According to certain embodiments, statistical models 330 also include multiple 'supervised learning' methods including linear regression, logistic regression, support vector machines, neural networks, and the like. With the supervised learning methods, a labeling mechanism 640 is used with the server training function 122 to build a statistical model 630 that includes identification of labeled states and events.

According to certain embodiments, statistical models 630 include "memory" such as recursive neural networks, or long short term memory neural networks, and model the signal profiles that indicate future issues. These signal profile models are included in the statistical model used for providing advanced notice of upcoming errors.

According to certain embodiments, statistical models 630 include a recommendation system, which allows various procedures, tasks, and extra information to be presented based on the operational condition of a modeled piece of equipment. Recommendations include replacement parts, maintenance procedures, necessary tools, service efficiencies, and the like.

According to certain embodiments, statistical models 630 include multiple configurations of visualization options for visually representing equipment operation on web and mobile platforms.

The server 106 of the present disclosure includes labeling mechanism 640 that is a set of tools for assigning an association, or label, between a real-world event and data related to a piece of equipment under monitoring. The statistical model processes use this contextualized, labeled data to build and improve models in order to identify and predict the events and states that were labeled. The labeling mechanism 640 applies meaning and context to machine operation and provides the context information needed for supervised learning and other modeling processes.

A real-time user mode of the labeling mechanism 640 enables a user to identify, label and describe events pertaining to a piece of equipment in real-time (e.g., as data is collected). The user indicates the labeling by choosing the equipment or statistical model that is being labeled, and pressing a button on a PC-based, web-based, or mobile-based tool interface when the event begins, completes, or is active. The user also adds additional context information to the label.

A historical user mode of the labeling mechanism 640 enables a user to identify, label and describe events pertaining to a piece of equipment that have occurred in the past (e.g., not in real-time). The user indicates this labeling by choosing the equipment or statistical model that is being labeled on a PC-based, web-based, or mobile-based tool interface. The user then views data related to the equipment, selects time periods and regions where events have occurred, and adds additional context information to the labels.

Automated real-time and historical modes of the labeling mechanism 640 enable automatic adding of labels to a statistical model or piece of equipment based on heuristic rules or integration with an external system. This is performed either in real-time or by post-processing log files, or externally generated labeling information.

According to certain embodiments, labels are automatically generated through anomaly detection processes, classification processes or other statistical methods.

According to certain embodiments, while in operational mode, anomaly detection processes within the statistical model detect abnormal operation in the equipment, automatically generate a label of the anomaly, and prompt a user to confirm or correct the anomaly.

Figure 6:
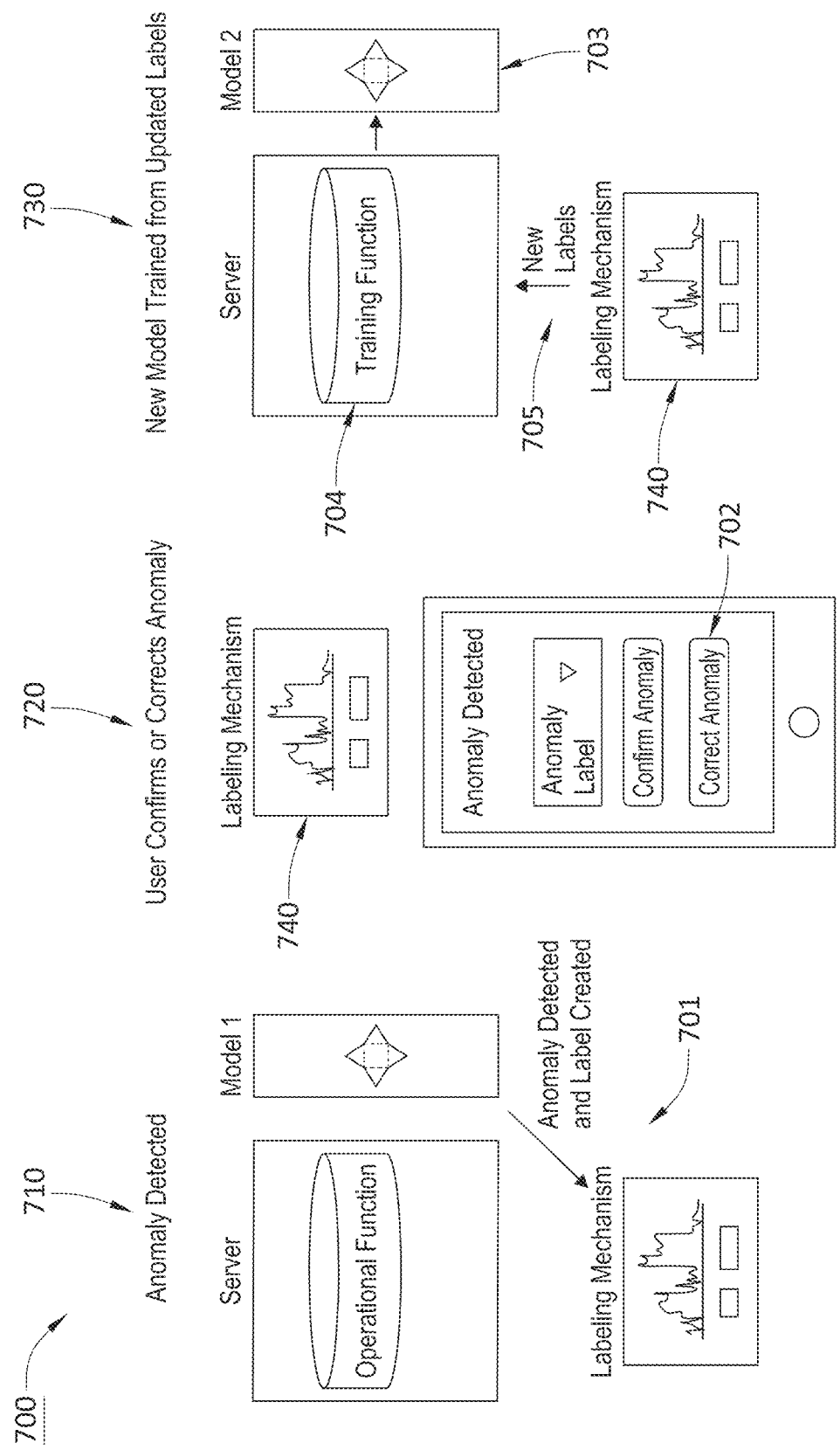
FIG. 6 illustrates an exemplary training function that incorporates anomaly detection, according to embodiments.

FIG. 6 illustrates an exemplary training function 700 that incorporates anomaly detection, according to embodiments. The anomaly is detected 710 and a label is generated for the anomaly 701. A user is able to confirm or correct the anomaly 720 (see 702) with the labeling mechanism 740. A new model 703 is then trained 730 and enabled using the updated label set 105. The process repeats as new anomalies occur.

The server training function 704 includes an additive raining function which provides the capability of building statistical models by combining or starting with various combinations of other statistical models and labelled data. The statistical models used as starting points in the additive training function can be any combination of categorical electromechanical subsystem models (for example, motors, compressors, pumps), equipment type models (for example, refrigerators or refrigerator model XYZ123), operational or environmental models (for example, equipment used indoors, equipment used during the daytime only), or end-installation models where a new function is to be added (for example, start with first floor refrigerator and add 'door left open' categorical model).

The labeling mechanism 740 includes the ability to select existing models to include in the training function 704 for a new statistical model 703. In this way, the additive training function can be performed along with the other functions of the labeling mechanism 740.

While in operational mode, the statistical model 703 includes the capability to detect if an additional modeling capability applies to the current model 703. If so, the new capabilities can be added to the statistical model 703 by training an updated model through the additive training function. A user may or may not be involved in approving this update.

Figure 7:
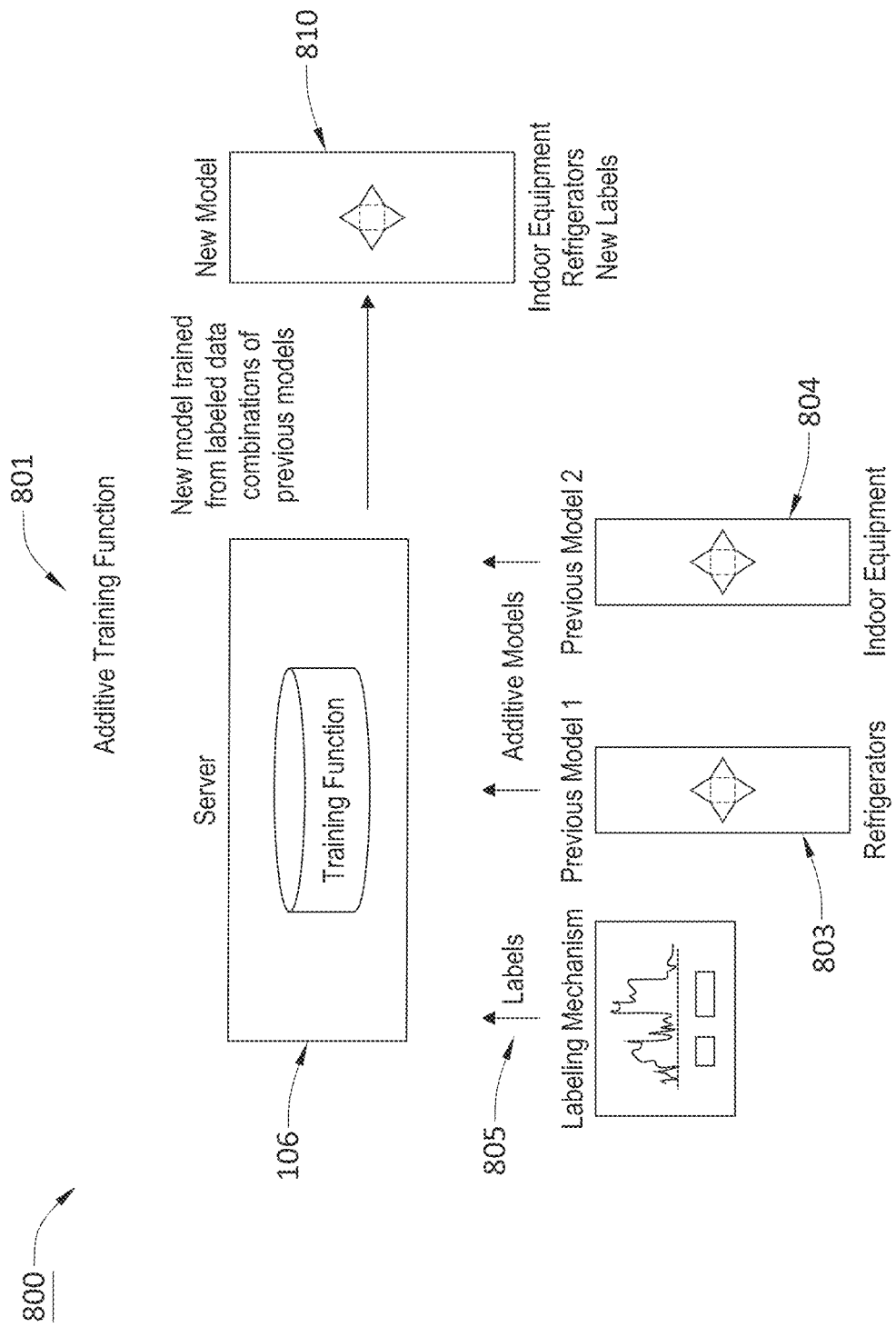
FIG. 7 illustrates an exemplary architecture including additive training function for use with the present system, according to certain embodiments.

FIG. 7 illustrates an exemplary architecture 800 including additive training function 801. In this example, the server 106 is in training mode and any number of existing categorical statistical models (803, 804) are combined with labels 805 to train a new statistical model 810 that is a combination of the characteristics of each component model (e.g., 803, 804). This process is performed continually to improve and adapt statistical models to changing needs.

Figure 8:
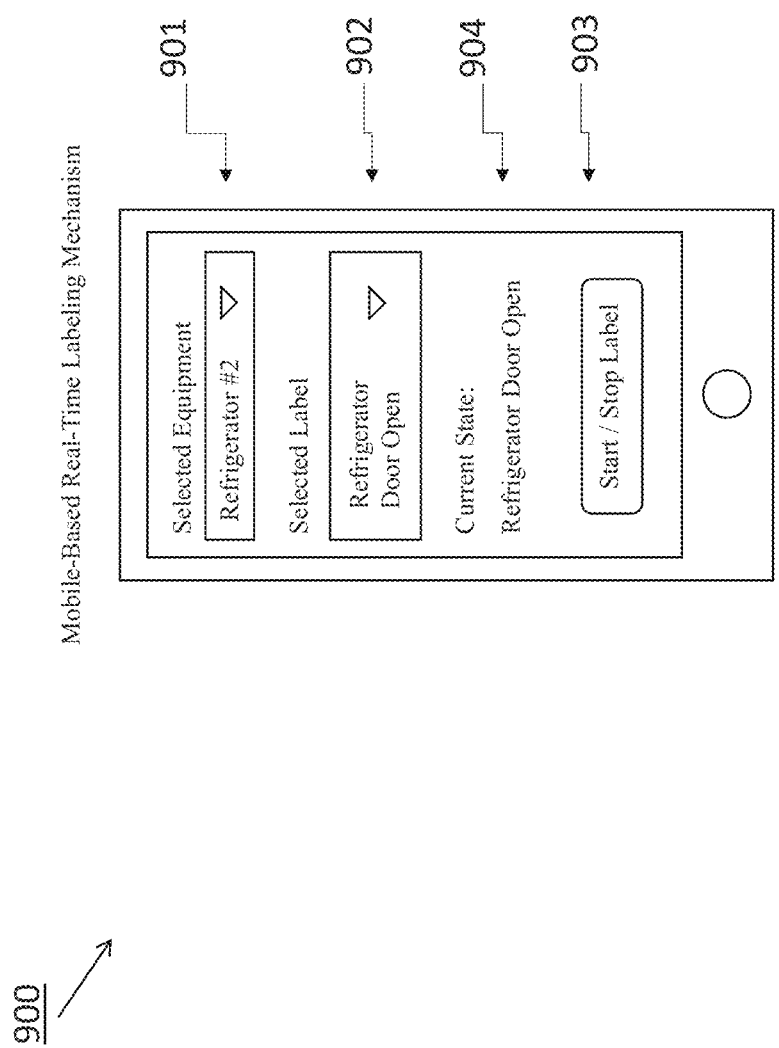
FIG. 8 illustrates an exemplary mobile labeling mechanism for use with the present system, according to certain embodiments.

FIG. 8 illustrates an exemplary mobile labeling mechanism 800 for use with the present system, according to certain embodiments. A mobile-based labeling mechanism 800 is used to label events occurring in real-time. In this embodiment, a piece of equipment is selected 801, then a label is selected or entered 802. In real-time, the label start/stop button 803 is used to label events and states of the equipment. The current label value is displayed 804.

An example use-case for this mechanism is labeling states on refrigerator equipment. When near the refrigerator, the 'Refrigerator Door Open' label is selected, and the 'Start' button is pressed at the same time the refrigerator door is opened. The 'Stop' button is then pressed at the same time the refrigerator door is closed. This can be repeated multiple times as needed to build a complete model. In this way, the labeling mechanism can be used to label events that occur in real-time.

Figure 9:
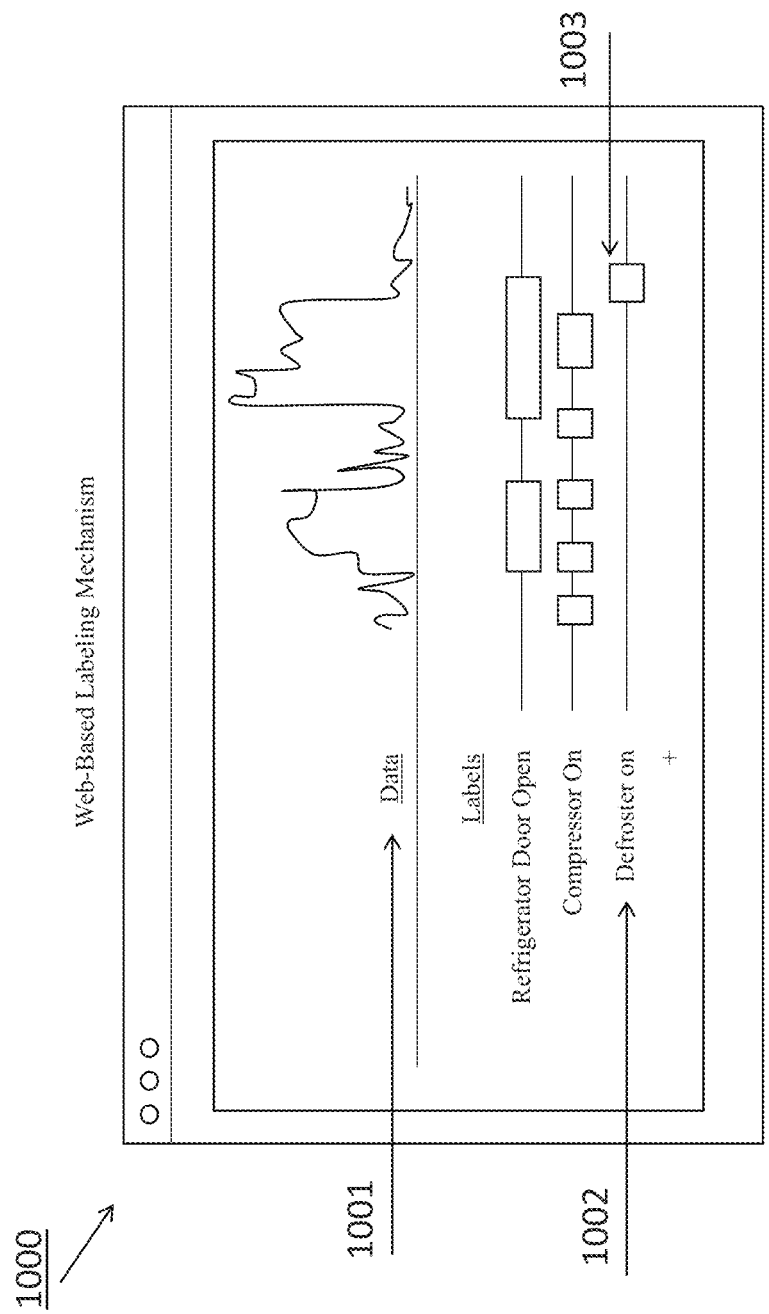
FIG. 9 illustrates an exemplary web-based labeling mechanism for use with the present system, according to certain embodiments.

FIG. 9 illustrates an exemplary web-based labeling mechanism 1000 for use with the present system, according to certain embodiments. A web-based historical labeling mechanism 1000 is used to label events that have occurred in the past. In this embodiment, a piece of equipment is selected, and a data type is optionally selected 1001. A label is then selected or entered 1002. Labels are then added by aligning the appropriate start-stop times with the shown data

1003. This can be repeated multiple times as needed for various labels, time ranges, equipment types, etc. as needed to build a complete model. In this way, the labeling mechanism can be used to label events that have occurred in the past.

An example use-case for this mechanism is labeling states on refrigerator equipment. After data has been taken for a refrigerator, the refrigerator can be selected, and labels can be added including "Refrigerator Door Open", "Compressor On", "Defroster On", and so on. Each label can then be selected, and periods of time are indicated in which the label is correct.

The mobile and web-based labeling mechanisms of the present embodiments allow non-technical users in the field to easily label data on running equipment. This vastly increases the ease of labeling data and increases the amount of labeled data available to the statistical models. This also allows models to change as labeling is improved over time. Prior art solutions are simply one-time lab labeling efforts that result in statistical models that are out-of-date and limited to the cases seen during lab evaluation.

For example, with the present embodiments, if a user decides that a label of "Refrigerator Door Open" is not sufficient for their needs, the user can decide to add a label called "Refrigerator Door Ajar". Once enough data was labeled with the new "Ajar" tag using the labeling mechanism, the statistical model can differentiate between when the refrigerator door was open versus only slightly ajar. In this example, the present disclosure allows the end-user to tailor the statistical model to their individual needs without the intervention of an engineering and data science team to build a new statistical model. This makes the present disclosure much faster at adapting to real-world user needs than prior art.

FIG. 9 illustrates an exemplary mobile labeling mechanism 1100 including the additive training function. This labeling mechanism training function is provided in all labeling mechanism use-cases. In this example, the user selects labels and previous models to include in additive training in which a new statistical model is generated from a combination of the selected component models.

According to certain embodiments, sources of labels for the labeling mechanism described herein are any combination of: human-generated via web, mobile, e-mail response, or PC-based interfaces; automatically generated via log-files, integration with another server or other data source; or automatically generated through configured heuristic rules. According to certain embodiments, values of the labels used by the labeling mechanism are any data that describes the operation or utilization of the equipment type and are any combination of: numerical values, binary classifiers, text strings or documents. The labels can be time-stamped with or without a time-duration and represent events, states, and combinations thereof.

According to certain embodiments, the labeling mechanism is activated during normal server operation if the statistical model applied to an asset detects a high probability of a state that needs additional labeling. In the operational function, the server applies the statistical models to the input data to determine the state and utilization, and if the operation for that state matches the acceptable baseline of operation within some tolerance. If the operation deviates significantly from the baseline, users are notified of the deviation and asked to report a label for the state. The label is a new state in the system and can be tagged as something of importance to the service organization. Once the new state is labeled the system may re-enter the training function, if necessary, to characterize and baseline the new label. The system is then adapted to understand the characteristics of the newly labeled event for future classification.

According to certain embodiments, the labeling mechanism is built on web, mobile, and PC-based platforms as a stand-alone tool, or is built into products on web, and mobile dashboards and e-mail notifications. This allows labeling to be integrated with the entire system platform.

During system operation, the labeling mechanism prompts users to confirm, reject, or correct an automatically generated label suggestion. The suggestion can be broad, indicating that a new state or event has been detected and asking the user to confirm whether a state or event did actually occur and to provide context. The suggestion can also be specific, indicating that a specific event or state has occurred with a significant probability and asking that the user confirm or deny that the event occurred.

By way of example, the system monitors and models clothing washing machines in a laundromat. The equipment under monitor is a family of washing machines. The adaptive sensing coordinator is a sensing module installed on-site at the same location as the washing machines. The coordinator incorporates sensor measurements of the mains electrical supply, the electrical current draw of the washing machine, and the ambient environment temperature and humidity. The coordinator connects to the server via a WiFi using a WiFi radio. The labeling mechanism is integrated into a mobile device application and a website. Users and end-customers use the mobile application labeling mechanism to tag events as they occur in real-time, and use the website to retroactively tag historical events. Tagged events describe normal and abnormal operation and include, for example: "washing machine on", "washing machine off", "washing machine in low power mode", "washing machine jam", "washing machine in spin cycle", "washing machine overload condition", and so on.

In this example, the server training function uses the labels from the labeling mechanism to build a statistical model that describes the labeled states. The server then uses the statistical model in the operational mode to detect the various states. For example, a user can now choose to be notified if a "washing machine overload" has occurred, or if the washing machine enters the "washing machine off" state, and so on.

A statistical model 130 was built using the labeling mechanism for a family of washing machines, and the statistical model can be applied to similar types of equipment. The server uses the statistical model to configure the adaptive sensing coordinator to provide the specific data needed by the model. This data may include removing measurements, adding statistical calculations, or other necessary data.

By way of another example, the system monitors and models refrigeration systems. The equipment under monitor is a family of refrigeration systems. The adaptive sensing coordinator is a sensor product installed on-site to the refrigerator under monitor. The sensing coordinator incorporates sensor measurements of mains electrical supply, current draw of the refrigeration system sub-components (compressor current, condenser unit current, fan current, etc.), refrigeration internal temperature, condenser unit ambient temperature, and a refrigerant leak sensor. The labeling mechanism is integrated into a mobile application, and a website. Users and end-customers use the mobile application labeling mechanism to tag events as they occur in real-time, and use the website to retroactively tag historical events. Tagged events describe normal and abnormal operation and include: "compressor on", "refrigerator door open", "refrigerator light on", "refrigerator short-cycling", "defrost cycle on", and so on.

The exemplary embodiments described herein of washing machines and refrigeration systems show the flexibility of the system created with the combination of a labeling mechanism, a statistical model, and an adaptive sensing controller. Due to this flexibility, the present embodiments are applicable to many more types of equipment than prior art solutions which tend to be single-purpose engineered solutions. It will be appreciated that, while the exemplary embodiments described herein include application to washing machines and refrigeration systems, the present disclosure is applicable to other types of equipment without departing from the scope of the disclosure.

The present embodiments' incorporation of an adaptive sensing coordinator, a labeling mechanism, and statistical models in a system allow a single system to apply to different types of equipment with different modeling and sensing needs. This is an improvement over prior art sensing and modeling solutions that are specific to a particular type of equipment, sensing need, or specific solution. Such improvement saves on computing and human resources, including server processing time and memory resources required by specificity of various equipment and models.

The present embodiments are faster and easier to adapt to different types of equipment than tailored custom solutions for each new type of equipment.

Prior art solutions require large engineering and data science teams to create a new sensing and modeling solution. Due to the integration of the labeling mechanism, the present disclosure is adaptable to new sensing and modeling solutions without needing custom engineering or data science resources.

Prior art labeling solutions are single purpose and usable only by engineers, programmers, and data scientists. The labeling mechanism included in the present disclosure empowers technicians, and non-technical general users to contribute to quality of statistical models through labeling. This results in superior statistical models.

Prior art solutions for understanding remote machine operation via sensors and processes exist. These solutions, however, are not well suited for machine-learning based statistical modeling methods due to limited data and a lack of contextualized training data. Due to the incorporation of a labeling mechanism and an adaptive sensing coordinator, the present disclosure provides improved remote machine understanding via higher quality data sets, and greatly superior statistical models built with well labeled training data.

A traditional problem in implementing machine learning systems that incorporate supervised learning processes is obtaining large and useful training datasets. The present embodiments provide a solution for obtaining training data on machine operation in the field labeled by experts in the machine operation. This significantly increases the amount of well labeled data available to these processes and results in better statistical models.

Prior art remote sensing solutions are specific to a particular sensing need, communication interface and storage capability and are thus limited in their application. The present embodiments of an adaptive sensing coordinator allows for a solution that is applicable to a much larger group of sensing needs, which allows for a cheaper and more broadly applicable sensing solution. This is because the adaptive sensing coordinator adjusts the sensor data, derivations, and data rate based on available network bandwidth and modeling needs.

The labeling mechanism described herein enables end users to tailor the statistical model in the equipment modeling platform to their needs in real-time. This results in a significant reduction in necessary computational resources: CPU, memory, and machine time needed to build and run the predictive models. Alternate solutions involve custom predictive models to be generated for each end-application. In this case, each individual model requires lengthy and expensive model training time as the predictive models are being tuned for the application. Thus, the labeling mechanism described herein is able to significantly reduce the necessary computing resources, while providing statistical models to many end applications. The use of anomaly detection processes in the labeling mechanism allow for a faster and more efficient model training process. Alternate solutions use excess computational resources (CPU, memory, hard drive, machine time) in training statistical models. The anomaly detection allows the training dataset to be minimized and thus reduces computational needs.

The inclusion of the sensor coordinator in the equipment modeling platform herein drastically reduces the data needed for statistical modeling of equipment performance. This data reduction minimizes communication bandwidth needed from remote sensors, reduces CPU time needed to process data, and reduces storage requirements of raw data.

In one example, raw sensor data is collected, processed and stored at 10 Hz sample rate and used for statistical modeling of equipment performance where the operational state of the equipment is detected once-per-minute. With the use of an adaptive sensing coordinator, this raw data is converted to the state detection within the sensing coordinator, and the data that is sent over the communication channel and stored in the server is updated once-per-minute. This results in a 600× savings in communication bandwidth, CPU processing, and data storage.

Prior art solutions use fixed sensing that is not configurable for specific equipment type, specific equipment unit, or specific unit use-cases. This results in excess data send over communication channels, processed by server CPUs, and stored in databases.

The inclusion of additive training into the training and operational functions of the equipment performance modeling platform described herein drastically decreases training time needed to build statistical models for end equipment. The training process for statistical models has high CPU processing, memory, and data storage requirements, so reducing the amount of time required to train a statistical model results in high savings of those resources.

The majority of end-equipment installations have specific use-cases and needs that apply only to the single installation. Prior art solutions train statistical models for each installation from scratch. This training requires high CPU processing, memory, and storage each time a statistical model is updated or when a model is applied to a new installation. With the present disclosure, the training time and resources required to update an existing model or deploy a model to a new installation are drastically reduced.

Although an example processing system has been described in FIG. 1B, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

According to embodiments, an apparatus for modeling and monitoring equipment performance data is communicably coupled with a sensor coordinator and a plurality of sensors, the plurality of sensor collecting sensor data from the plurality of sensors, the sensor data representing performance parameters of a monitored device. The apparatus comprises at least one processor and at least one memory including computer program code, the at least one memory and the computer program code configured to, with the at least one processor, cause the apparatus to: receive processed data from the sensor coordinator, wherein the sensor coordinator receives sensor data from at least one sensor device and processes the sensor data to produce the processed data; programmatically generate a statistical model based upon the processed data; and programmatically train, by using a training function, the statistical model based upon the processed data, wherein the statistical model is associated with the monitored device.

In some embodiments, the training function is based at least upon a machine learning model. In some embodiments, the apparatus further comprises a labelling mechanism that is configured to be one of user controlled and automatic. In some embodiments, the apparatus further comprises a labelling mechanism that is one or more of real-time and historical. In some embodiments, the monitored device inherits the statistical model and sensor data associated with the monitored device and contributes the inherited statistical model and sensor data in aggregate to the generated statistical model.

In some embodiments, the apparatus is further caused to remotely configure the plurality of sensors. In some embodiments, the apparatus is further caused to control sensor selections, derivations, and data rates. In some embodiments, the apparatus is further caused to control sensor selections, derivations, and data rates wherein the control is based on needs of the generated statistical model and network characteristics. In some embodiments, the statistical model uses mains voltage and current to portray equipment state and usage. In some embodiments, the statistical model uses mains voltage and current to flag anomalous operation.

In some embodiments, the apparatus is further caused to receive sensor measurements from the sensor coordinator, wherein the sensor coordinator is configured to acquire sensor measurements, configure and process the sensor measurements for a predetermined statistical model, and transmit the measurements to the server.

In some embodiments, the apparatus is further caused to configure the sensor coordinator to process the sensor measurements for a predetermined statistical model. In some embodiments, the sensor coordinator comprises a set of configurable processing steps and a communication channel to the server. In some embodiments, the sensor coordinator comprises a plurality of raw type sensors. In some embodiments, the plurality of raw type sensors are embedded in the sensor coordinator. In some embodiments, the plurality of raw type sensors are connected to the sensor coordinator via a wired or wireless network. In some embodiments, the sensor coordinator is configured to acquire one or more sensor measurements comprising one or more of mains electricity peak and RMS voltage, mains electricity peak and RMS current, mains electricity active, reactive, and apparent power and energy, power quality measurements including peak voltages and currents, transient events including voltage and current surges, spikes, and EFT transients, electrical mains ground-to-neutral peak and RMS voltage, electrical mains voltage and current harmonics and line frequency, ambient temperature and humidity.

In some embodiments, the sensor coordinator is configured to acquire one or more sensor measurements comprising one or more of vibration, acceleration, sound or air pressure, gas and chemical sensing, thermal and optical imaging.

In some embodiments, the sensor coordinator is configured as a sensor hub by incorporating a local networking technology to connect to and aggregate data from the sensors. In some embodiments, the local networking technology comprises one of Zigbee®, WIFI access point, BLE central, 802.15.4, 6-LoWPAN, and Z-wave. In some embodiments, the sensor coordinator is configured to record a plurality of higher-order derivations based on raw sensor values. In some embodiments, the plurality of higher-order derivations includes one or more of Fourier and wavelet transforms, filter functions including low-pass, high-pass, and other band form or noise-reduction filters, statistical indices including mean, maximum, minimum, and standard deviations, derivatives, integrations, sums, and basic arithmetic operations, and indication of environment or equipment operational state or state-changes.

In some embodiments, the sensor coordinator is configured to monitor an individual monitored device. In some embodiments, the sensor coordinator is configured to monitor a plurality of pieces of equipment.

In some embodiments, a method for modeling equipment performance data and monitoring equipment performance comprises collecting data corresponding to equipment performance of a monitored device from one or more data sources including an adaptive sensing coordinator, cataloging the data, and characterizing and tracking the operation of the monitored device based at least on the data and statistical models based on the data and historical data. In some embodiments, the statistical models are built and altered via a training function. In some embodiments, the data is stored in a repository.

In some embodiments, cataloging the data comprises associating the data with the monitored device, equipment type, measurement type, time of collection and the operation of the equipment at the time of collection.

In some embodiments, a user is notified of an equipment event. In some embodiments, the event is one or more of a detected anomaly, a set of readings that does not match an existing operational state, entering or exiting of a known state, and the application of a heuristic condition. In some embodiments, the heuristic conditions are configurable to detect specific events of interest including voltage or current specific limits which, when crossed, resulting in triggering a notification to a user.

In some embodiments, the training function includes statistical modeling techniques including one or more of characterizing sensor data input and generating a model of labels to operational usage and utilization of the monitored device. In some embodiments, an association, or label, is assigned between a real-world event and data related to a monitored device under monitoring by a labeling mechanism. In some embodiments, the association or labeling occurs in real-time as data is collected. In some embodiments, assigning an association or labeling includes prompting a user to choose the equipment or statistical model that is being labeled or assigned an association, receiving the user's equipment or statistical model selection, and receiving the user's indication of event begins, completes, or is active. In some embodiments, assigning an association or labeling further comprises receiving additional context information from the user. In some embodiments, assigning an association or labeling occurs after data is collected in a historical user mode of the labeling mechanism. In some embodiments, the labeling mechanism prompts users to confirm, reject, or correct an automatically generated label suggestion.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for modeling and monitoring equipment performance data comprising:
    at least one processor and at least one memory including computer program code, the at least one memory and the computer program code configured to, with the at least one processor, cause the apparatus to:
        receive processed data produced from sensor data from at least one sensor device, wherein the sensor data represents performance parameters of a monitored device;
        generate a statistical model based upon the processed data, wherein the statistical model includes a machine learning model;
        the statistical model based upon the processed data, wherein the statistical model is associated with the monitored device and is trained to determine one or more operational states of the monitored device; and
        retrain the statistical model to determine a new operational state for the monitored device in response to operation of a determined operational state by the statistical model deviating from a baseline beyond a tolerance, wherein the new operational state corresponds to the operation deviating from the baseline.

2. The apparatus of claim 1, wherein the apparatus further comprises a labeling mechanism configured to assign an association between a real-world event and data related to the monitored device.

3. The apparatus of claim 1, wherein the monitored device inherits the statistical model and sensor data associated with the monitored device and contributes an inherited statistical model and sensor data in aggregate to the statistical model.

4. The apparatus of claim 1, further caused to remotely configure a plurality of sensors and to control sensor selections, derivations, and data rates based on needs of the statistical model and network characteristics.

5. The apparatus of claim 1, wherein the statistical model uses mains voltage and current to portray equipment state and usage and to flag anomalous operation.

6. The apparatus of claim 1, further comprising:
    a sensor coordinator configured to acquire sensor measurements and configure and process the sensor measurements for a predetermined statistical model to produce the processed data, wherein the apparatus is further caused to configure the sensor coordinator to process the sensor measurements for the predetermined statistical model and to receive the processed data from the sensor coordinator.

7. The apparatus of claim 6, wherein the sensor coordinator is configured to acquire one or more sensor measurements comprising one or more selected from a group of mains electricity peak and RMS voltage, mains electricity peak and RMS current, mains electricity active, reactive, and apparent power and energy, power quality measurements including peak voltages and currents, transient events including voltage and current surges, spikes, and EFT transients, electrical mains ground-to-neutral peak and RMS voltage, electrical mains voltage and current harmonics and line frequency, ambient temperature and humidity, vibration, acceleration, sound or air pressure, gas and chemical sensing, and thermal and optical imaging.

8. The apparatus of claim 6, wherein the sensor coordinator is configured to record a plurality of higher-order derivations based on raw sensor values, and wherein the plurality of higher-order derivations includes one or more selected from a group of Fourier and wavelet transforms, filter functions including low-pass, high-pass, and other band form or noise-reduction filters, statistical indices including mean, maximum, minimum, and standard deviations, derivatives, integrations, sums, and basic arithmetic operations, and indication of environment or equipment operational state or state-changes.

9. A method of modeling and monitoring equipment performance data comprising:

receiving, via at least one processor, processed data produced from sensor data from at least one sensor device, wherein the sensor data represents performance parameters of a monitored device;

generating, via the at least one processor, a statistical model based upon the processed data, wherein the statistical model includes a machine learning model;

training the statistical model based upon the processed data, wherein the statistical model is associated with the monitored device and is trained to determine one or more operational states of the monitored device; and retraining the statistical model, via the at least one processor, to determine a new operational state for the monitored device in response to operation of a determined operational state by the statistical model deviating from a baseline beyond a tolerance, wherein the new operational state corresponds to the operation deviating from the baseline.

10. The method of claim 9, further comprising:

assigning, via the at least one processor, an association between a real-world event and data related to the monitored device.

11. The method of claim 9, wherein the monitored device inherits the statistical model and sensor data associated with the monitored device and contributes an inherited statistical model and sensor data in aggregate to the statistical model.

12. The method of claim 9, further comprising:

remotely configuring, via the at least one processor, a plurality of sensors and controlling sensor selections, derivations, and data rates based on needs of the statistical model and network characteristics.

13. The method of claim 9, wherein the statistical model uses mains voltage and current to portray equipment state and usage and to flag anomalous operation.

14. The method of claim 9, wherein a sensor coordinator is configured to acquire sensor measurements and configure and process the sensor measurements for a predetermined statistical model to produce the processed data, the method further comprising:

configuring, via the at least one processor, the sensor coordinator to process the sensor measurements for the predetermined statistical model.

15. The method of claim 14, wherein the sensor coordinator is configured to acquire one or more sensor measurements comprising one or more selected from a group of mains electricity peak and RMS voltage, mains electricity peak and RMS current, mains electricity active, reactive, and apparent power and energy, power quality measurements including peak voltages and currents, transient events including voltage and current surges, spikes, and EFT transients, electrical mains ground-to-neutral peak and RMS voltage, electrical mains voltage and current harmonics and line frequency, ambient temperature and humidity, vibration, acceleration, sound or air pressure, gas and chemical sensing, and thermal and optical imaging.

16. The method of claim 14, wherein the sensor coordinator is configured to record a plurality of higher-order derivations based on raw sensor values, and wherein the plurality of higher-order derivations includes one or more selected from a group of Fourier and wavelet transforms, filter functions including low-pass, high-pass, and other band form or noise-reduction filters, statistical indices including mean, maximum, minimum, and standard deviations, derivatives, integrations, sums, and basic arithmetic operations, and indication of environment or equipment operational state or state-changes.

17. A computer program product for modeling and monitoring equipment performance data, the computer program product comprising at least one non-transitory computer-readable storage medium having computer-readable program instructions stored thereon, the computer-readable program instructions executable by at least one processor to cause the at least one processor to:

receive processed data produced from sensor data from at least one sensor device, wherein the sensor data represents performance parameters of a monitored device;

generate a statistical model based upon the processed data, wherein the statistical model includes a machine learning model;

train the statistical model based upon the processed data, wherein the statistical model is associated with the monitored device and is trained to determine one or more operational states of the monitored device; and retrain the statistical model to determine a new operational state for the monitored device in response to operation of a determined operational state by the statistical model deviating from a baseline beyond a tolerance, wherein the new operational state corresponds to the operation deviating from the baseline.

18. The computer program product of claim 17, wherein the computer-readable program instructions further cause the at least one processor to:

assign an association between a real-world event and data related to the monitored device.

19. The computer program product of claim 17, wherein the monitored device inherits the statistical model and sensor data associated with the monitored device and contributes an inherited statistical model and sensor data in aggregate to the statistical model.

20. The computer program product of claim 17, wherein the computer-readable program instructions further cause the at least one processor to:

remotely configure a plurality of sensors and control sensor selections, derivations, and data rates based on needs of the statistical model and network characteristics.

21. The computer program product of claim 17, wherein the statistical model uses mains voltage and current to portray equipment state and usage and to flag anomalous operation.

22. The computer program product of claim 17, wherein a sensor coordinator is configured to acquire sensor measurements and configure and process the sensor measurements for a predetermined statistical model to produce the processed data, and wherein the computer-readable program instructions further cause the at least one processor to:

configure the sensor coordinator to process the sensor measurements for the predetermined statistical model.

23. The computer program product of claim 22, wherein the sensor coordinator is configured to acquire one or more sensor measurements comprising one or more selected from a group of mains electricity peak and RMS voltage, mains electricity peak and RMS current, mains electricity active, reactive, and apparent power and energy, power quality measurements including peak voltages and currents, transient events including voltage and current surges, spikes, and EFT transients, electrical mains ground-to-neutral peak and RMS voltage, electrical mains voltage and current harmonics and line frequency, ambient temperature and humidity, vibration, acceleration, sound or air pressure, gas and chemical sensing, and thermal and optical imaging.

24. The computer program product of claim 22, wherein the sensor coordinator is configured to record a plurality of higher-order derivations based on raw sensor values, and wherein the plurality of higher-order derivations includes one or more selected from a group of Fourier and wavelet transforms, filter functions including low-pass, high-pass, and other band form or noise-reduction filters, statistical indices including mean, maximum, minimum, and standard deviations, derivatives, integrations, sums, and basic arithmetic operations, and indication of environment or equipment operational state or state-changes.

* * * * *

UNITED STATES PATENT AND TRADEMARK OFFICE
CERTIFICATE OF CORRECTION

| | |
|---|---|
| PATENT NO. | : 11,494,531 B2 |
| APPLICATION NO. | : 16/190692 |
| DATED | : November 8, 2022 |
| INVENTOR(S) | : Nicholas J. McGranahan et al. |

It is certified that error appears in the above-identified patent and that said Letters Patent is hereby corrected as shown below:

In the Claims

Claim 1, Column 20, Line 8, please replace "the statistical model based upon the processed data," with -- train the statistical model based upon the processed data, --

Signed and Sealed this
Fourteenth Day of March, 2023

Katherine Kelly Vidal
*Director of the United States Patent and Trademark Office*